United States Patent [19]

Selover et al.

[11] E Re. 28,711

[45] Reissued Feb. 10, 1976

[54] PROCESS FOR PRODUCING BORON NITRIDE FELT

[75] Inventors: Theodore B. Selover, Shaker Heights; Robert A. Rightmire, Northfield; Philip R. Regan, Mayfield Heights, all of Ohio

[73] Assignee: The Standard Oil Company, Cleveland, Ohio

[22] Filed: Oct. 30, 1974

[21] Appl. No.: 519,078

Related U.S. Patent Documents

Reissue of:

[64] Patent No.: 3,816,242
Issued: June 11, 1974
Appl. No.: 244,869
Filed: Apr. 17, 1972

[52] U.S. Cl. ..... 162/157 R; 136/146; 162/138; 162/181 A; 162/181 R

[51] Int. Cl.[2] ..... D21H 5/18

[58] Field of Search ..... 162/157 R, 138, 181 A, 162/181 R, 145, 152; 136/146

[56] References Cited

UNITED STATES PATENTS

| | | | |
|---|---|---|---|
| 2,335,242 | 11/1943 | Greider et al. | 162/152 X |
| 2,914,107 | 11/1959 | Gaines | 162/152 |
| 3,017,318 | 1/1962 | Labino et al. | 162/152 |
| 3,058,809 | 10/1962 | Taylor | 423/290 |
| 3,136,683 | 6/1964 | Denlinger | 162/152 |
| 3,434,917 | 3/1969 | Kraus et al. | 162/145 |
| 3,476,641 | 11/1969 | Milewski | 162/152 |
| 3,510,359 | 5/1970 | Selover et al. | 136/146 |
| 3,576,708 | 4/1971 | Breiner | 162/181 A |
| 3,684,650 | 8/1972 | Doring et al. | 162/152 X |

*Primary Examiner*—S. Leon Bashore
*Assistant Examiner*—Peter Chin
*Attorney, Agent, or Firm*—John F. Jones; Sherman Joseph Kemmer; Evelyn R. Kosman

[57] ABSTRACT

A novel process for producing a thin flexible self supporting boron nitride felt comprising the following steps [.] :

A. purifying boron nitride fiber by washing with water and subsequently extracting with an aliphatic alcohol containing from 1 to 3 carbon atoms;

B. forming a mat from the fibers in step A and incorporating therein an aqueous solution of an inorganic water soluble binder selected from the group consisting of water soluble halides, nitrates, nitrites and carbonates of the alkali metals, the alkaline earth metals, the Group III A metals and their mixtures; and C. drying the resulting binder-containing mat obtained from step (B) at a temperature below the melting point of the salt.

4 Claims, No Drawings

PROCESS FOR PRODUCING BORON NITRIDE FELT

Matter enclosed in heavy brackets [ ] appears in the original patent but forms no part of this reissue specification; matter printed in italics indicates the additions made by reissue.

This invention relates to a method for preparing an ion-permeable, electron-insulating separator for use in an electrical energy storage device. More particularly this invention relates to a method for preparing a separator composed of boron nitride felt which is particularly useful in electrical energy storage devices such as electrochemical cells under the most chemically severe operating conditions. A separator of this type constitutes an effective barrier between electrodes of opposite polarity and provides a means for spacing the electrodes.

Under operating conditions in some electrochemical cells and particularly in cells employing fused salt electrolytes, the electrodes undergo distortion as is evidenced by their buckling and swelling. Heretofore the distortion was compensated for by spacing the electrodes far enough apart so that even after buckling and swelling the electrodes failed to contact one another. Thus by one method of the prior art short-circuiting between electrodes was avoided. However, such excessive spacing was both wasteful and inefficient.

The general requirements of the separator of the present invention are that it be as thin as possible to minimize electrical resistance and to allow for compact electrical energy storage device, and that it possess the mechanical strength to withstand operating conditions entailing charging and discharging of the cell. Because electrochemical reaction devices such as electrochemical cells herein described operate over a wide temperature range from about ambient to 750°C and above, depending on the electrolyte, the internal components are subject to considerable stress in the form of expansion and contraction. Therefore, the separator of the present invention must possess the structural integrity to withstand wide ranges of operating conditions. The separator must also possess insulating properties to prevent the short-circuiting of the electrodes should a bridge form from materials capable of promoting the formation of short-circuits. Also the separator must have a maximum porosity and must accommodate ionic diffusion. Any hindrance of the ions in their movement affects the efficiency of the electrochemical device. Of course, the porosity of the separator desirably approaches 100 percent.

The boron nitride separator prepared by the process of the present invention is designed for use in a highly corrosive, high-temperature environment, and it therefor is manifested that it have a high melting point, and be chemically and thermally inert, stable, and insoluble under operating conditions.

Boron nitride bulk fiber as obtained from commercial sources is either in the form of a loose, fluffy fiber or is in the form of roving, both of which are difficult to handle and to convert into a reproducible felt form. Although boron nitride felt is available commercially, the felt is unsatisfactory from the standpoint of impurities introduced in felting. By the process of this invention a minimum of impurities is introduced in the processing steps, and the roving or loose, fluffy boron nitride fiber can be readily converted into a flexible, integral, self-supporting felt of high purity that is suitable for use under the operating conditions heretofore specified. This is accomplished by employing an inorganic salt or combination of salts as a binder for the boron nitride fibers in the mat. Preferredly for practical purposes, the inorganic salt or salts utilized in this process are the more common, water soluble salts wherein the cation may be an alkali metal, an alkaline earth metal or a Group III A metal and the anion is a halide, nitrate, nitrite, or certain carbonates. In addition to the use of a single salt as a binder material, binary and ternary salt mixtures can also be utilized, such as lithium chloride-potassium chloride, potassium iodide-lithium iodide, potassium chloride-magnesium chloride, magnesium chloride-sodium chloride, lithium bromide-potassium bromide, calcium chloride-lithium chloride, lithium fluoride-rubidium fluoride, magnesium chloride-rubidium chloride, aluminum chloride-lithium chloride, and mixtures thereof. Examples of ternary mixtures are lithium chloride-potassium chloride-cesium chloride and lithium bromide-potassium bromide-lithium chloride. A preferred binder composition is a eutectic mixture of potassium chloride and lithium chloride.

The separator of this invention is particularly suitable for use in fused salt batteries wherein the binder may have the same composition as that of the electrolyte of the electrochemical cell. It is also feasible to employ the binder-saturated boron nitride felt as the only ion-containing and conducting medium in the battery, wherein the felt is placed between and is wrapped around the electrodes.

In the broadest aspect of this invention, the process for preparing the felt comprises adding an aqueous suspension of boron nitride fiber to a saturated solution of the binder in water, stirring the resulting mixture to obtain a uniform suspension of the fiber in water, separating the fiber-salt mixture from the aqueous medium as by filtration or by some other known means to produce a felt-like sheet, and subsequently shaping and drying the sheet. Alternatively, in a more preferred procedure, an aqueous suspension of the boron nitride fiber is filtered to produce a thin fiber mat, an aqueous solution of the binder is sprayed onto the surface of the mat, and the mat is then shaped and dried to obtain an integral, flexible, spacer. This latter procedure enables better control of the binder composition and concentration in the felt, particularly where the binder comprises a mixture of salts in certain definite proportions. On slow drying, the fiber mat may be reshaped periodically to adjust the form and thickness to the desired dimensions.

For satisfactory performance in an electrical energy storage battery, the boron nitride fiber employed in preparing the felt of this invention should contain a minimum of foreign matter so as not to contribute excessively to the leakage current of the electrochemical cell. It is therefor preferred that the boron nitride fiber contain less than about one percent by weight of any foreign substance. Boric oxide is a common impurity found in the fibers and this can be readily removed by converting the boric oxide to boric acid by means of washing with water and removing the boric acid by extraction with a low molecular weight ($C_1$ to $C_3$) aliphatic alcohol. It is also advantageous, but not essential to use fibers with a diameter of $\leq$ 10 microns, and a density of ≥ 1.85 grams/cc of fibers, and a $d_{002}$ spacing ≤ 3.41Å.

Structural variables of the felt such as orientation of fibers, uniformity of fiber density, and thickness, are largely controlled by the concentration of fiber in the aqueous suspension. By using more dilute suspensions of the fiber, it is possible to obtain felt with uniform density, minimum orientation and a greater degree of cross-linking required for strength and flexibility to survive subsequent handling. With the use of a more dilute suspension it is also possible to produce felt with a minimum of thickness which is important from the standpoint of space conservation in electrochemical cells. For example, we have found that felts with satisfactory physical properties and having dimensional thicknesses of from 15 to 75 mils can be obtained by employing concentrations of boron nitride fiber of from about 1 to 5 grams per liter of water. It is also preferred, but not essential however, for a mat in this thickness range to have a fiber density of from about 2.5 to about 12.5 × $10^{-2}$ g/cm² of geometric surface area of felt. It has been found that lower drying rates also contribute to reduction of separator thickness, and that very satisfactory results are obtained by slow drying under reduced pressures at temperatures ranging from about 50°C to a temperature just below the melting point of the binder.

The concentration of the binder in solution necessary to produce satisfactory felts may vary with the salt employed and the manner in which it is incorporated into the boron nitride fiber. On adding an aqueous suspension of the fiber to a solution of the binder, it is preferred to employ a saturated salt solution, and the concentration will vary with temperature and the solubility characteristics of the particular salt employed. If, however, the salt is applied by spraying on to a preformed mat of fibers, generally more dilute salt solutions are required. It is preferred that the final concentration of the binder in the mat range from about 2 × $10^{-2}$ to about 5.5 × $10^{-2}$ g/cm² of mat.

It has also been found to be advantageous to produce multilayer laminates of boron nitride felt by combining several layers to obtain felt with increased cross-linking of fibers and to compensate for minor variations in thickness.

The following examples represent preferred modes of carrying out the process of this invention, but the scope of the invention is not limited to these procedures.

EXAMPLE 1

Twenty-five grams of boron nitride roving (Carborundum, high purity textile roving) were added to 500 mls. of distilled water. The slurry was boiled for 15 minutes and the water decanted. This latter step was repeated two additional times in order to convert boric oxide present as an impurity in the fiber to boric acid. The boric acid was then removed from the boron nitride roving by soaking in 500 mls. of methanol for 15 minutes and decanting the methanol. The boron nitride fiber was then placed in a Waring three-speed commercial blender containing 3,500 mls. of distilled water, and the fibers were blended for one second. The blended mixture was then diluted with distilled water to a total volume of 12 liters and agitated by means of an air sparger. The resulting suspension was filtered by vacuum through a porous filter with a nickel surface and having 3.8 μ holes and 40 percent void fraction, and the fiber mat was checked for uniformity and density. The mat was removed from the filter with the aid of a gentle stream of air directed to the back of the filter and cut to the appropriate shape and size required for the separator. Excess water was removed from the mat by pressing, and the mat was sprayed with a binder solution consisting of a mixture of 7.3 grams of potassium chloride and 5.8 grams of lithium chloride in 52 mls. of water. The final mat containing 2.54 × $10^{-2}$ g/cm² of binder, was then dried in a hot air oven at 50°C for one hour and reshaped to a mold block. The mat was returned to the oven and dried at 125°C, and then placed in a vacuum chamber and dried for a period of about 15 hours during which time the temperature increased to 300°C and the pressure was reduced to approximately $10^{-5}$ Torr. The final boron nitride mat had a uniform thickness of 0.030 inches.

The resulting felt was utilized as a separator between the electrodes in an electrochemical reaction cell comprising a high surface area carbon electrode and an opposing electrode composed of an aluminum-lithium alloy. The space between the electrodes provided a clearance of 0.030 inches. The electrodes were immersed in an electrolyte composed of a eutectic mixture of lithium chloride and potassium chloride, (59 mole percent LiCl and 41 mole percent KCL), and the cell was operated at a temperature of 500°C. The cell was contained in a rectangular 1,008 carbon steel housing, 6 inches wide, 8 inches high, and 1 inch thick, with the fused salt about ½ inch from the top of the cell. The cell was sealed to prevent liquid and gas evolution and was provided with a positive current carrier. The cell performed in the rechargeable mode as a secondary sealed system. The cell was cycled for 30 days between 3.34 v and 1.0 v. The separator was inspected after completion of the test and was found to be in excellent condition.

EXAMPLE 2

The procedure of Example 1 was repeated using a eutectic mixture of lithium bromide and potassium bromide (mol ratio 1.63 LiBr/1KBr) as the electrolyte and as the binder in the boron nitride felt. The fiber density of boron nitride in the final felt was 8.10 × $10^{-2}$ g/cm² of mat, the felt had a thickness of 0.050 inches, and it had a binder content of 4.0 × $10^{-2}$ g/cm² of mat. The cell was cycled as in Example 1 for a period of 30 days and on examination of the separator on completion of the test the separator was found to be in good condition.

EXAMPLE 3

The procedure of Example 1 was repeated using lithium chloride-potassium chloride eutectic as the electrolyte and cesium chloride as the binder in the boron nitride felt. The felt had a fiber density of 4.05 × $10^{-2}$ g/cm² of mat, a thickness of 0.025 inches, and it had a binder concentration equivalent to 2.0 × $10^{-2}$ g/cm² of mat.

When employed as a separator in an electrical energy storage cell as in Example 1, which was operated for 20 days, the separator was found to be in excellent condition.

EXAMPLE 4

The procedure of Example 1 was repeated except that the binder in the boron nitride mat consisted of a mixture of lithium chloride, rubidium chloride and potassium chloride in a molar ratio of 2.55:1.18:1. The mat had a thickness of 0.015 inches, a fiber density of $2.43 \times 10^{-2}$ g/cm$^2$ of mat, and a salt concentration of $5.1 \times 10^{-2}$ g/cm$^2$ of mat. The separator was wrapped around both electrodes of the cell, and the only electrolyte present in the system was held interstitially by the separator. After cycling the cell for 15 days, the separator showed no signs of deterioration.

We claim:

1. A process for producing a thin, flexible, integral boron nitride felt comprising the following steps:

A. purifying boron nitride fiber by washing with water and subsequently extracting with an aliphatic alcohol containing from one to three carbon atoms;

B. forming a mat from the fibers in step (A) and incorporating therein an aqueous solution of a binder [in an amount such that the final concentration of the said binder in the mat ranges from about $2 \times 10^{-2}$ to about $5.5 \times 10^{-2}$ g/cm$^2$], said binder being an inorganic salt selected from the group consisting of water soluble halides, nitrates, nitrites and carbonates of the alkali metals, the alkaline earth metals, the Group III A metals, and their mixtures; and C. drying the resulting binder-containing mat obtained from step (B) at a temperature below the melting point of the salt.

2. The process in claim 1 wherein the binder in step (B) is incorporated by adding an aqueous suspension of the boron nitride fiber to a saturated aqueous solution of the binder, and forming the mat therefrom.

3. The process in claim 1 wherein the binder in step (B) is incorporated by spraying the mat formed from boron nitride fiber with an aqueous solution of the binder.

4. The process in claim 1 wherein the inorganic salt consists of a eutectic mixture of lithium chloride and potassium chloride.

* * * * *